(12) United States Patent
Sjöland et al.

(10) Patent No.: US 12,556,212 B2
(45) Date of Patent: *Feb. 17, 2026

(54) MULTI-BAND EQUALIZERS

(71) Applicant: Telefonaktiebolaget LM Ericsson (publ), Stockholm (SE)

(72) Inventors: Henrik Sjöland, Lund (SE); Mohammed Abdulaziz, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

This patent is subject to a terminal disclaimer.

(21) Appl. No.: 18/334,893

(22) Filed: Jun. 14, 2023

(65) Prior Publication Data
US 2023/0327696 A1 Oct. 12, 2023

Related U.S. Application Data

(63) Continuation of application No. 17/608,646, filed as application No. PCT/EP2019/061777 on May 8, 2019, now Pat. No. 11,716,108.

(51) Int. Cl.
*H04B 1/18* (2006.01)
*H04B 1/16* (2006.01)

(52) U.S. Cl.
CPC .............. *H04B 1/18* (2013.01); *H04B 1/1607* (2013.01); *H04B 1/1638* (2013.01)

(58) Field of Classification Search
CPC .......... H04B 1/40; H04B 1/18; H04B 1/0053; H04B 1/1638; H04B 1/0078; H04B 1/04; H04B 1/1607
See application file for complete search history.

(56) References Cited

U.S. PATENT DOCUMENTS

| | | | |
|---|---|---|---|
| 8,363,710 B2 * | 1/2013 | Luo | H03H 11/1291 375/232 |
| 9,941,916 B2 * | 4/2018 | Chakraborty | H03G 3/20 |
| 10,243,538 B2 | 3/2019 | Kato et al. | |
| 10,615,775 B2 | 4/2020 | Takamine et al. | |
| 10,886,892 B2 | 1/2021 | Nosaka | |
| 11,923,879 B2 * | 3/2024 | Xu | H03F 3/245 |
| 2005/0212614 A1 * | 9/2005 | Peluso | H03B 5/1215 331/177 V |

(Continued)

FOREIGN PATENT DOCUMENTS

| | | | | |
|---|---|---|---|---|
| CN | 102638239 A | | 8/2012 | |
| CN | 103563261 A | * | 2/2014 | ........... H04B 1/525 |

(Continued)

*Primary Examiner* — Edan Orgad
(74) *Attorney, Agent, or Firm* — Murphy, Bilak & Homiller, PLLC (57) ABSTRACT

On-chip multi-band equalizers for adjusting signal strength for a receiver receiving multi-band frequency signals are provided. An example multi-band equalizer comprises multiple series connected tapped LC resonators. The tapped LC resonator may be capacitive tapping or inductive tapping, where both frequency and gain of the frequency bands of interest may be programmed by tuning the capacitances of the programmable capacitors and/or selecting the tapped-out terminals of the inductors. The multi-band equalizer may be connected to a signal node, for instance between two amplifiers in the receiver.

20 Claims, 10 Drawing Sheets

(56) References Cited

U.S. PATENT DOCUMENTS

| | | | |
|---|---|---|---|
| 2012/0201172 A1 | 8/2012 | Khlat et al. | |
| 2013/0244591 A1 | 9/2013 | Weissman et al. | |
| 2015/0097637 A1 | 4/2015 | Pye et al. | |
| 2015/0214985 A1 | 7/2015 | Lee et al. | |
| 2015/0236671 A1 | 8/2015 | Smith et al. | |
| 2015/0318890 A1 | 11/2015 | Uejima | |
| 2020/0358461 A1* | 11/2020 | Jussila | H04B 1/1036 |
| 2023/0103039 A1* | 3/2023 | Guo | H04B 1/0057 455/78 |

FOREIGN PATENT DOCUMENTS

| | | | | |
|---|---|---|---|---|
| CN | 105210292 | A | 12/2015 | |
| CN | 105474536 | A | 4/2016 | |
| CN | 205681454 | U | 11/2016 | |
| CN | 108964788 | A | 12/2018 | |
| CN | 110495096 | A | 11/2019 | |
| JP | 2008160471 | A | 7/2008 | |
| JP | 2009253989 | A | 10/2009 | |
| JP | 2017508385 | A | 3/2017 | |
| JP | 2017528100 | A | 9/2017 | |
| JP | 2019506778 | A | 3/2019 | |
| KR | 101834245 | B1 | 4/2018 | |
| WO | WO-02078123 | A1 * | 10/2002 | H01Q 5/378 |
| WO | 2008062753 | A1 | 5/2008 | |

* cited by examiner

MULTI-BAND EQUALIZERS

TECHNICAL FIELD

Embodiments herein relate to multi-band equalizers. In particular, they relate to multi-band equalizers for adjusting signal strength for a receiver receiving multi-band frequency signals in a communication device.

BACKGROUND

Wireless communication devices or equipment usually comprise transceivers comprising transmitter and receiver. The transmitter typically up-converts baseband signals to Radio Frequency (RF) signals for transmission, and the receiver down-converts received RF signals to baseband signals for further processing.

There is a trend towards very wideband implementations of receivers and transmitters in wireless equipment like cellular base-stations. There is also a trend towards more integrated solutions, i.e. to implement more functionality on-chip with integrated circuits. These trends aim at reducing the cost and increasing the flexibility of a solution. A wideband integrated receiver according to this trend will consist of wideband amplifiers and an analog to digital converter (ADC). However, not all frequencies will be used for communication, and not all used frequency bands will arrive at the base-station with equal signal strength. To address that, some off-chip components are used. These are multi-band filters, such as triplexers, quadplexers, etc. The integrated circuit can then feature individual variable gain amplifiers (VGAs) for the different filter channels, which are then fed to a signal combiner. For high performance, a low noise amplifier (LNA) is used prior to the multi-band filter. The signal path thus enters the LNA chip at the LNA input, exists the LNA chip to connect to the input of the multi-band filter, then again enters the VGA chip at the multiple VGA inputs. If the signal combiner can then be implemented on-chip, the rest of the signal path will be on-chip. As can be seen the cost of equalizing the channel strengths is rather high, with the signal path going off chip and then on-chip with multiple channels, plus the cost of an off-chip customized multi-band filter. A lot of the flexibility of the solution is also lost due to the multi-band filter having fixed frequency bands. However, without equalizing the channel strengths, additional dynamic-range in the ADC is needed, which would be very challenging to achieve and come at a high cost in power consumption. If different frequency bands are to be used in the base-station, the multi-band filter needs to be replaced, and a new customized filter design is needed. Thus the multi-band filter solution using an off-chip filter with fixed frequencies is in-flexible. Another major issue with this solution is noise, since when combining the output signals of the VGAs, their noise will also be combined. The VGAs will produce noise at their outputs, which will be present not only at the frequencies of their own channels, but also at the other channels. The result of this is an increased effective receiver noise figure due to the signal combination of the multi-band filter architecture.

SUMMARY

Embodiments herein provide an equalizer for adjusting signal strength with improved performance on flexibility, cost, size and/or noise performance.

According to one aspect of embodiments herein, there is provided a multi-band equalizer for adjusting signal strength for a receiver receiving multi-band frequency signals. The multi-band equalizer comprises multiple resonators, each resonator has a first, a second and a third terminals. Each resonator comprises an inductor connected between the first and second terminals and two programmable capacitors connected in series between the first terminal and second terminal. The interconnection of the two programmable capacitors is tapped out and connected to the third terminal. The multiple resonators are series connected such that the third terminal of a preceding resonator is connected to the first terminal of a succeeding resonator. When used in the receiver, the first terminal of the first resonator is connected to a signal node of the receiver and the third terminal of the last resonator is connected to a signal ground, or the first terminal of the first resonator is connected to a signal ground and the third terminal of the last resonator is connected to a signal node of the receiver.

According to one aspect of embodiments herein, there is provided a multi-band equalizer for adjusting signal strength for a receiver receiving multi-band frequency signals. The multi-band equalizer comprises multiple resonators, each resonator has a first, a second and a third terminals. Each resonator comprises an inductor connected between the first and second terminals. The inductor has two or more tapped out terminals with different inductances, the two or more tapped out terminal are selectively connected to the third terminal. Each resonator further comprises a programmable capacitor connected between the first and second terminals. The multiple resonators are series connected such that the third terminal of a preceding resonator is connected to the first terminal of a succeeding resonator. When used in the receiver, the first terminal of the first resonator is connected to a signal node of the receiver and the third terminal of the last resonator is connected to a signal ground, or the first terminal of the first resonator is connected to a signal ground and the third terminal of the last resonator is connected to a signal node of the receiver.

In other words, multi-band equalizers according embodiments herein comprise multiple series connected inductor capacitor (LC) resonators with tapping. The number of simultaneous bands that can be supported equals the number of LC resonators. The tapping may be either inductive or capacitive and is programmable. Both center frequency and gain of each frequency band may be tuned by tuning the capacitances of the programmable capacitors and/or selecting the tapped out terminals of the inductors. By controlling the gain using programmable tapping the gain can be changed without affecting the bandwidth of the resonators.

Multi-band equalizers according to embodiments herein may be included in a signal chain of wideband amplifiers, such as LNAs and VGAs, where a signal node between two amplifier stages is used to connect the equalizer. The first resonator may be connected to a signal node, and the last to a signal ground. The signal node will then see an impedance that is programmable, with peaks at the center frequencies of the resonators.

Multi-band equalizers according to some embodiments herein are flexible, since the frequencies of the bands may be changed by programming the capacitances. By controlling the gain with tapping, rather than loading, the quality factor, i.e. the bandwidth of the resonators is independent on the gain setting.

Using a fully passive equalizer structure results in high dynamic range and low power consumption.

Multi-band equalizers according to embodiments herein are suitable for on-chip integration.

The number of simultaneous frequency bands may be scaled by including more resonators in the structure.

In some embodiments, a single amplifier chain may be used, and there is no need for parallel paths with noise issue related signal combination.

Therefore, embodiments herein provide multi-band equalizers with improved performance on flexibility, cost, size and/or noise.

BRIEF DESCRIPTION OF THE DRAWINGS

Examples of embodiments herein are described in more detail with reference to attached drawings in which:

FIG. 4 a) and b) are schematic views of differential multi-band equalizers according to embodiments herein;

DETAILED DESCRIPTION

Figure 1:
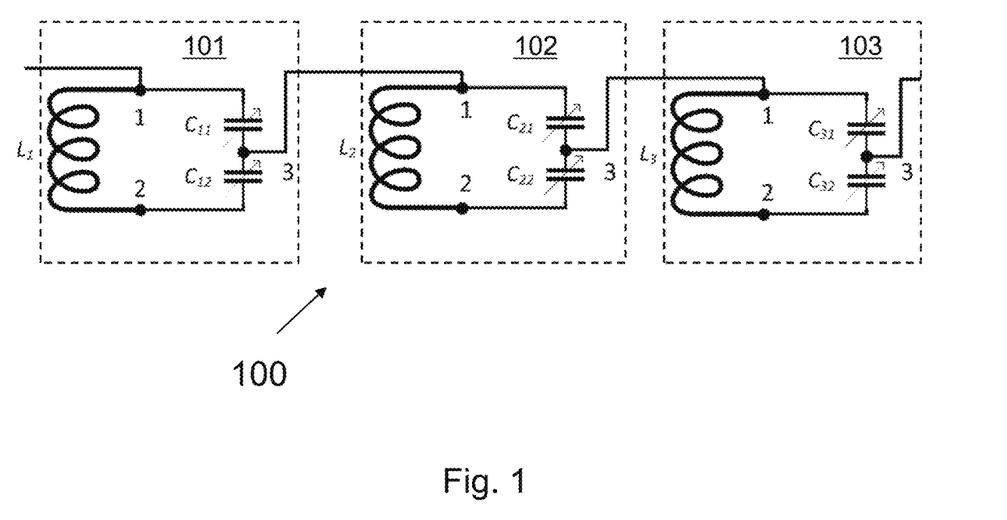
FIG. 1 is a schematic view of a multi-band equalizer according to a first embodiment herein.

FIG. 1 shows a multi-band equalizer 100 according to a first embodiment herein for adjusting signal strength for a receiver receiving multi-band frequency signals. The multi-band equalizer comprises multiple n resonators 101, 102, 103 . . . . Each resonator has a first 1, a second 2 and a third 3 terminals. Each resonator comprises an inductor Ln, n=1, 2, 3 . . . connected between the first and second terminals, and two programmable capacitors Cn1/Cn2, n=1, 2, 3 . . . , connected in series between the first terminal and second terminal. The interconnection of the two programmable capacitors is tapped out and connected to the third terminal.

The multiple resonators are series connected such that the third terminal of a preceding resonator is connected to the first terminal of a succeeding resonator. For example, the third terminal of the first resonator 101 is connected to the first terminal of the second resonator 102, and so forth.

Figure 2:
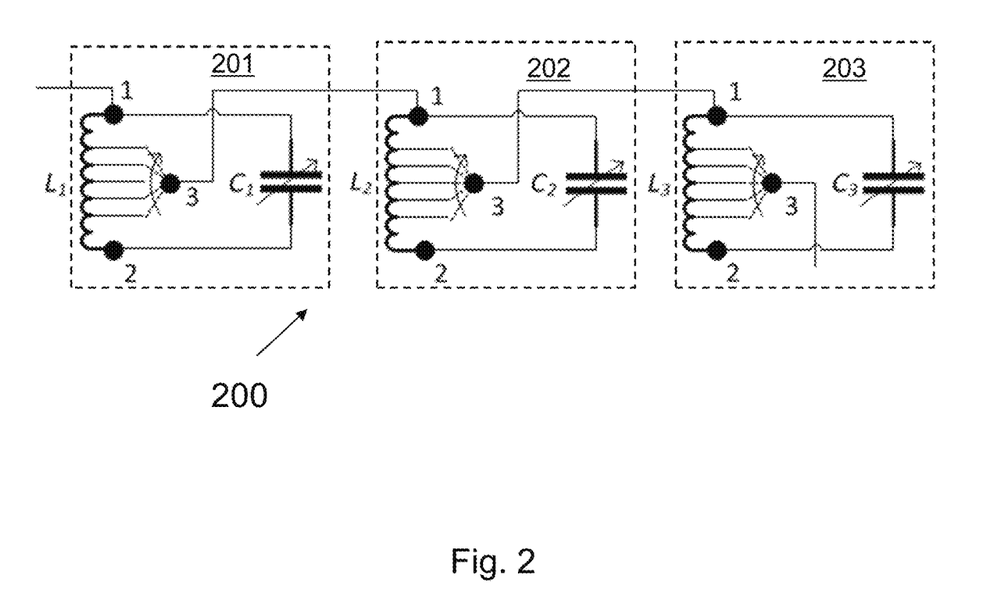
FIG. 2 is a schematic view of a multi-band equalizer according to a second embodiment herein.

FIG. 2 shows a multi-band equalizer 200 according to a second embodiment herein for adjusting signal strength for a receiver receiving multi-band frequency signals.

The multi-band equalizer 200 comprises multiple n resonators 201, 202, 203 . . . . Each resonator has a first 1, a second 2 and a third 3 terminals. Each resonator comprises an inductor Ln, n=1, 2, 3 . . . connected between the first and second terminals, wherein the inductor has two or more tapped out terminals with different inductances. The two or more tapped out terminals are selectively connected to the third terminal.

Each resonator further comprises a programmable capacitor Cn, n=1, 2, 3 . . . connected between the first and second terminals.

The multiple resonators 201, 202, 203 are series connected such that the third terminal of a preceding resonator is connected to the first terminal of a succeeding resonator. For example, the third terminal of the first resonator 201 is connected to the first terminal of the second resonator 202, and so forth.

When the multi-band equalizer 100, 200 is used in a receiver, the first terminal of the first resonator may be connected to a signal node of the receiver and the third terminal of the last resonator may be connected to a signal ground, or other way around, the first terminal of the first resonator may be connected to a signal ground and the third terminal of the last resonator may be connected to a signal node of the receiver.

Figure 3:
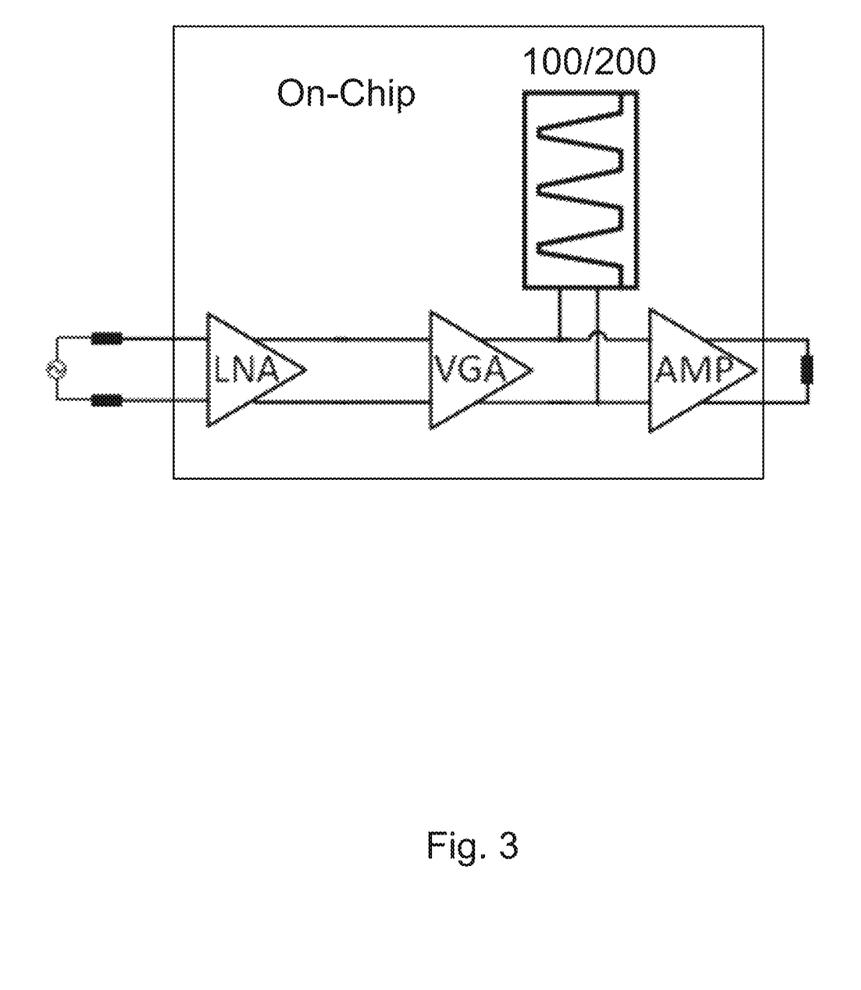
FIG. 3 is a schematic block view of a receiver front-end in which a multi-band equalizer according to embodiments herein is implemented.

The multi-band equalizer 100, 200 may be included in a signal chain of wideband amplifiers, such as LNAs and VGAs, where a signal node between two amplifier stages may be used to connect the equalizer. FIG. 3 shows an example receiver architecture where the multi-band equalizer 100, 200 is used after VGA. The multi-band equalizer 100, 200 may be integrated on-chip together with other amplifier circuits LNA, VGA, AMP.

The tapped inductor structure may be used to feed bias current to the signal node through the equalizer. This means that the equalizer may be used as a load to an amplifier stage.

The principle operation of the multi-band equalizer 100, 200 will be explained in the following with reference to FIG. 1. As can be seen the multi-band equalizer 100 has 3 tapped resonators, each consisting of one inductor Ln and two capacitors Cn1, Cn2. The parallel resonance frequency, where the resonator has high impedance, is equal to $$f_{res,n} = \frac{1}{2\pi\sqrt{L_n \cdot \frac{C_{n1} \cdot C_{n2}}{C_{n1} + C_{n2}}}} \quad (1)$$

The impedance of the resonator at resonance is equal to $$R_n = 2\pi \cdot f_{res,n} \cdot L_n \cdot Q_n \quad (2)$$

Where Qn is the quality factor of the LC resonator. For on-chip realizations this is typically in the order of 10, but there is a trade-off with chip area and tuning range.

The amount of this impedance seen at the equalizer input at the resonance frequency depends on the setting of the tap in the resonator, i.e. the ratio of Cn1 and Cn2. At that frequency the other resonators are off-resonance and their series connection will provide low additional impedance. So the total equalizer impedance in a certain band will be set by the resonator of that band and its tap setting. At frequencies far from resonance of any resonator, like between bands of interest, all series connected resonators provide low impedance. The total impedance of the equalizer then gets low, the inter-band interferences signals are grounded through the equalizer, and the signal levels of inter-band interferences are then suppressed. Interference at such frequencies will then require less headroom in the ADC and cause less intermodulation distortion.

Therefore, according to the embodiments herein, a tunable multi-band equalizer suitable for on-chip integration is realized. The multi-band equalizer 100, 200 comprises multiple series connected tapped LC-resonators so that both center frequency and gain of each frequency band may be tuned. Both the gain and resonance frequency are tunable by tuning the capacitances of the programmable capacitors in the multiple resonators. For each resonator, the gain and resonance frequency of that resonator are tunable by tuning the capacitances of the programmable capacitors and/or selecting the tapped out terminals of the inductor in that resonator. The number of simultaneous bands that can be supported equals the number of resonators. When the tunable multi-band equalizer 100, 200 is connected to a signal node in a receiver, the signal node will then see an impedance that is programmable, with peaks at the center frequencies of the resonators, the magnitude of the peaks is controlled by the inductor tapping point selection or capacitance ratio setting.

As shown in FIGS. 1 and 2, the tapping may be either inductive or capacitive. In case of inductive tapping, each inductor has multiple taps which are selected by switches, and in case of capacitive tapping two series connected programmable capacitors are used in each resonator, with the tap in between.

With inductive tapping the resonance frequency is set using the programmable capacitor Cn, and the gain is set by programming the inductive tap. The tuning of frequency and gain are thus separated to two different components so that the two parameters may then be tuned independently. This provides for easier control of the circuit and less trade-offs due to conflicting simultaneous tuning ranges. A slightly more complicated inductor layout will, however, result. However, since the highest quality factor is anyway typically not needed, this may be realized without significant compromises.

With capacitive tapping both the resonance frequency and gain are set by the capacitors, so that when controlling the gain by changing the ratio between the capacitors Cn1, Cn2, the capacitance of the series connected capacitors must still be maintained not to alter the resonance frequency, and vice versa. In this case there will be some limitations in simultaneous tuning range of the two parameters that are not present with inductive tapping, but on the other hand the inductors have a simpler layout with capacitive tapping.

Figure 4:
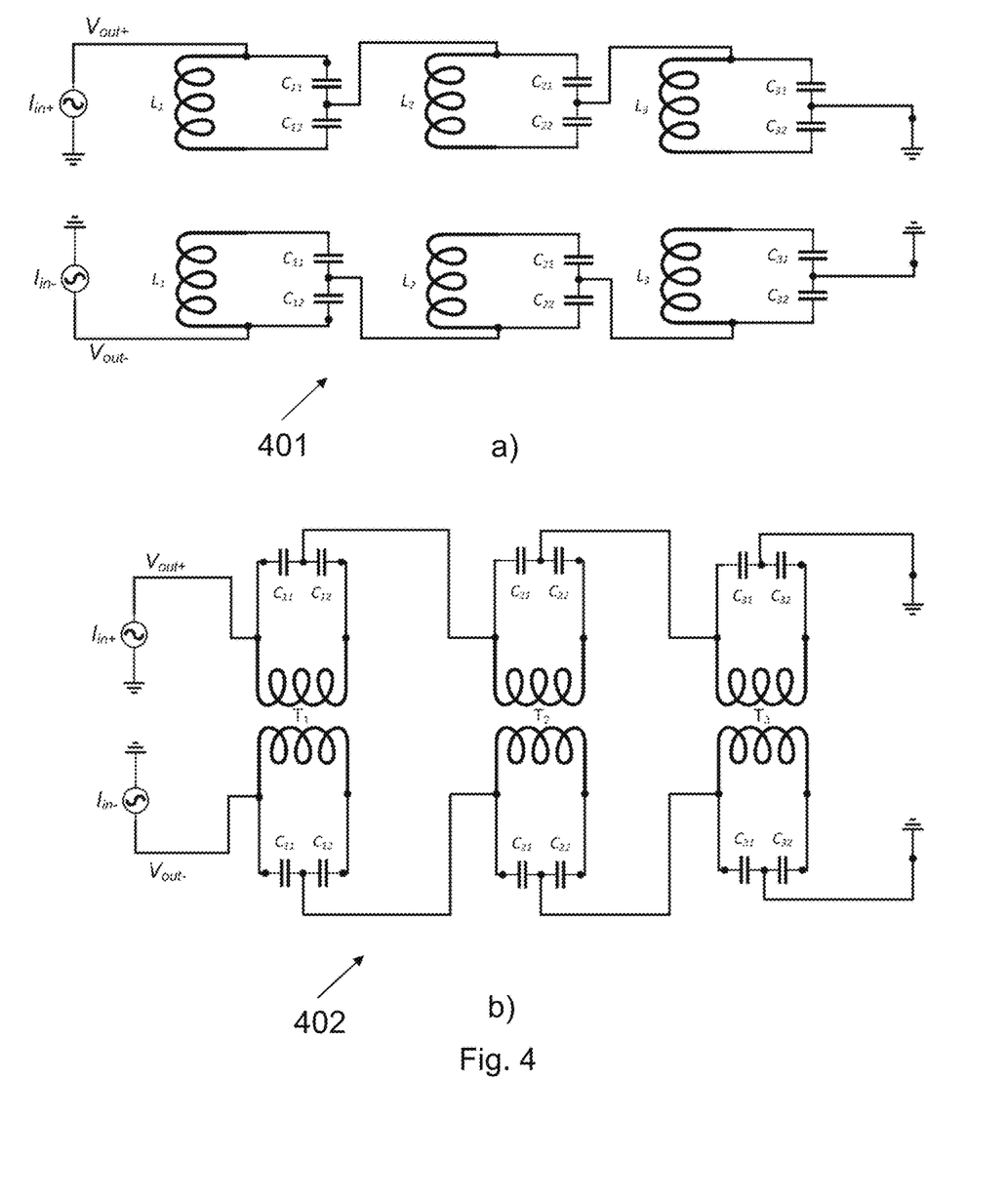

The multi-band equalizers 100, 200 shown in FIGS. 1 and 2 are single-ended. According to some embodiments herein, a differential multi-band equalizer may comprise two of the multi-band equalizers 100, 200. FIG. 4 shows an example of a differential multi-band equalizer comprising two of the multi-band equalizers 100 with capacitive tapping, where a) shows a pseudo-differential multi-band equalizer 401 comprising two single-ended equalizers, where inductors in two corresponding resonators are implemented separately, and b) shows a differential multi-band equalizer 402, where pairs of inductors in two corresponding resonators are implemented by transformers T1, T2, T3 to save chip area. Similarly, a differential multi-band equalizer may comprise two of the multi-band equalizers 200 with inductive tapping, where pairs of inductors in two corresponding resonators may be implemented separately or by transformers.

Figure 5:
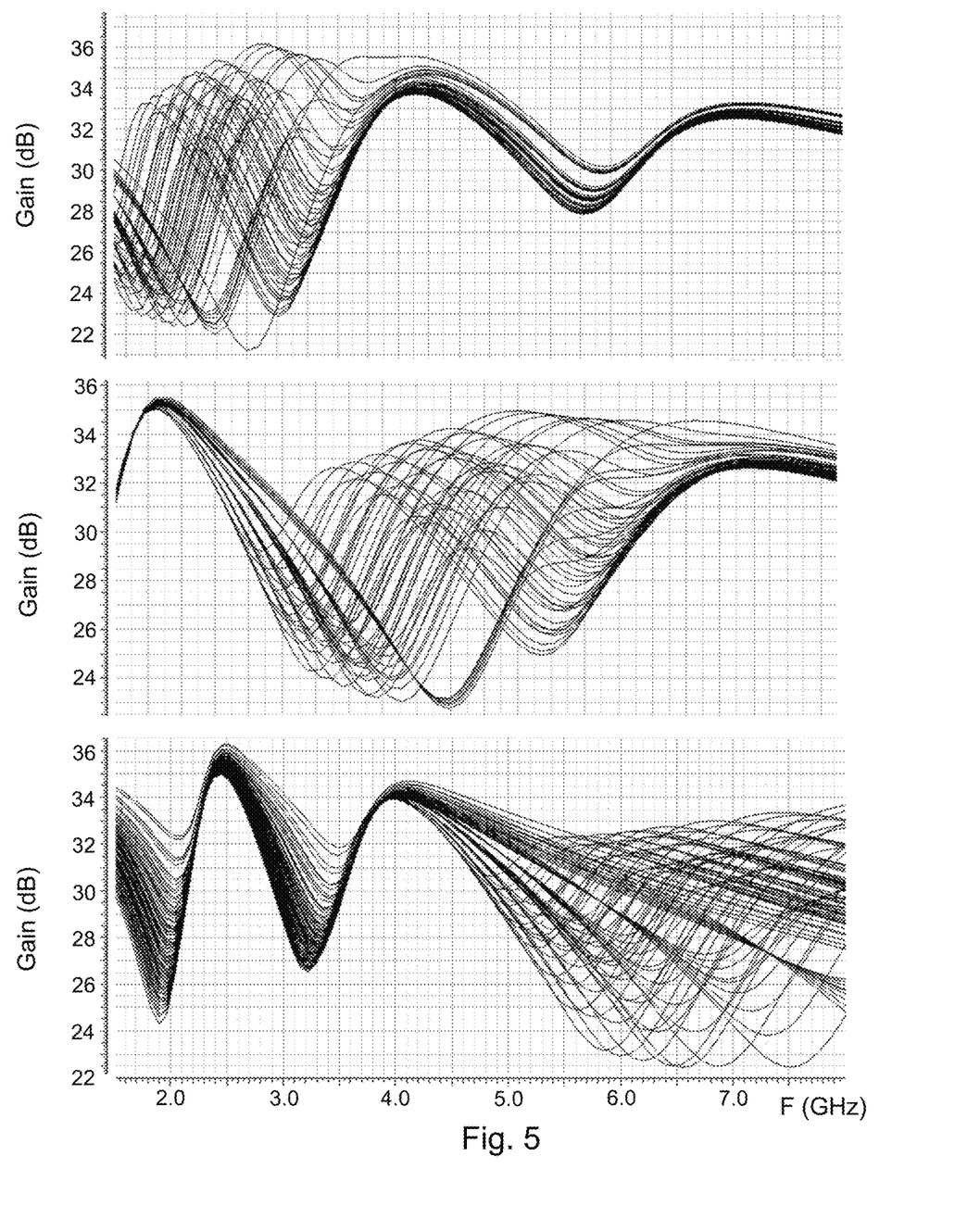
FIG. 5 shows simulation results for a multi-band equalizer with capacitive tapping according to embodiments herein.

To evaluate and demonstrate the performance of the multi-band equalizer 100, 200, 401, 402, simulations are performed for a wideband receiver, e.g. 2 to 6.5 GHz with 3 simultaneous bands. The simulations results of the multi-band equalizer 100 with capacitive tapping are shown in FIG. 5, where the top figure shows tuning of the first frequency band e.g. 2-3.2 GHz, the middle figure shows tuning of the second frequency band e.g. 3.5-5 GHz, and the bottom figure shows tuning of the third frequency band e.g. 5.4-7.5 GHz. As can be seen in the figures, the frequency and gain of each band may be configured without affecting the other bands. The frequency/amplitude controls are not orthogonal, but this is a minor issue that may be solved in the digital domain in a controller of the equalizer. There will, however, be a limitation in simultaneous tuning range of frequency and gain.

Figure 6:
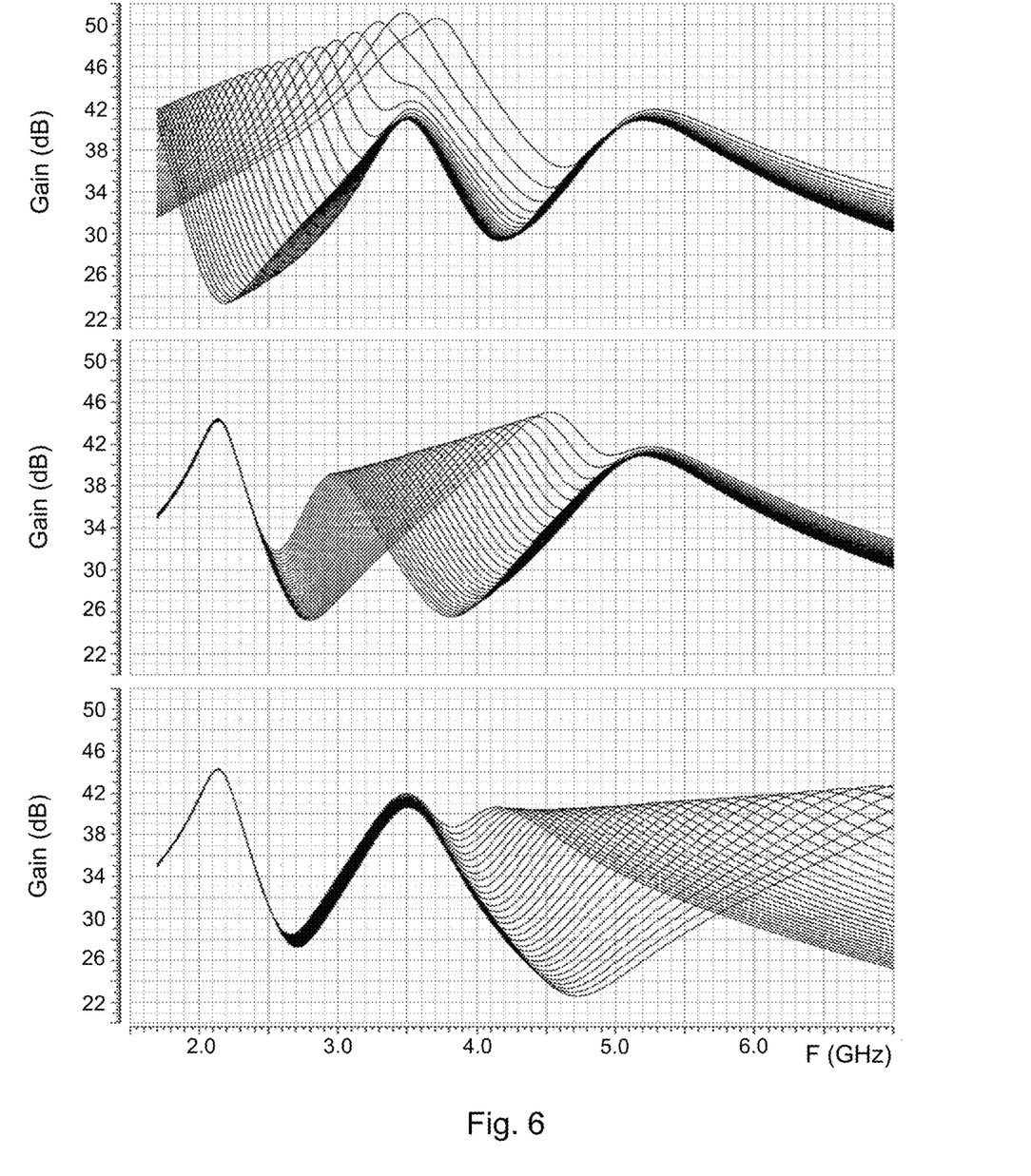
FIG. 6 shows simulation results for frequency tuning of a multi-band equalizer with inductive tapping according to embodiments herein.
Figure 7:
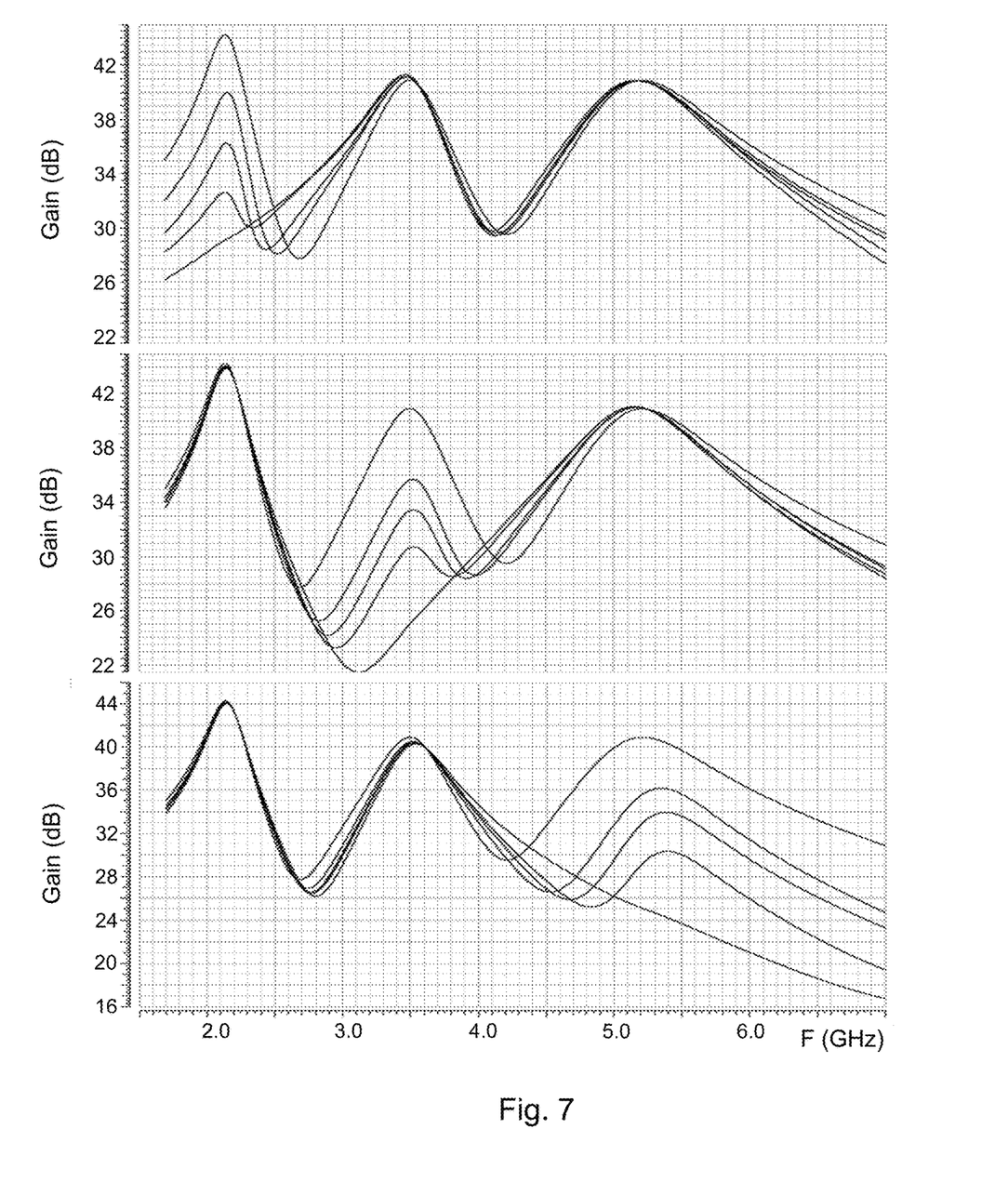
FIG. 7 shows simulation results for gain tuning of a multi-band equalizer with inductive tapping according to embodiments herein.

The simulation results of the multi-band equalizer 200 with inductive tapping are shown in FIGS. 6 and 7, where FIG. 6 shows frequency tuning of each band, and FIG. 7 shows gain tuning of each band. As can be seen in the figures the frequency/amplitude of each band may be independently controlled without affecting the other two bands. It is clear in the figures that orthogonal frequency/amplitude configuration is inherently achieved.

Figure 8:
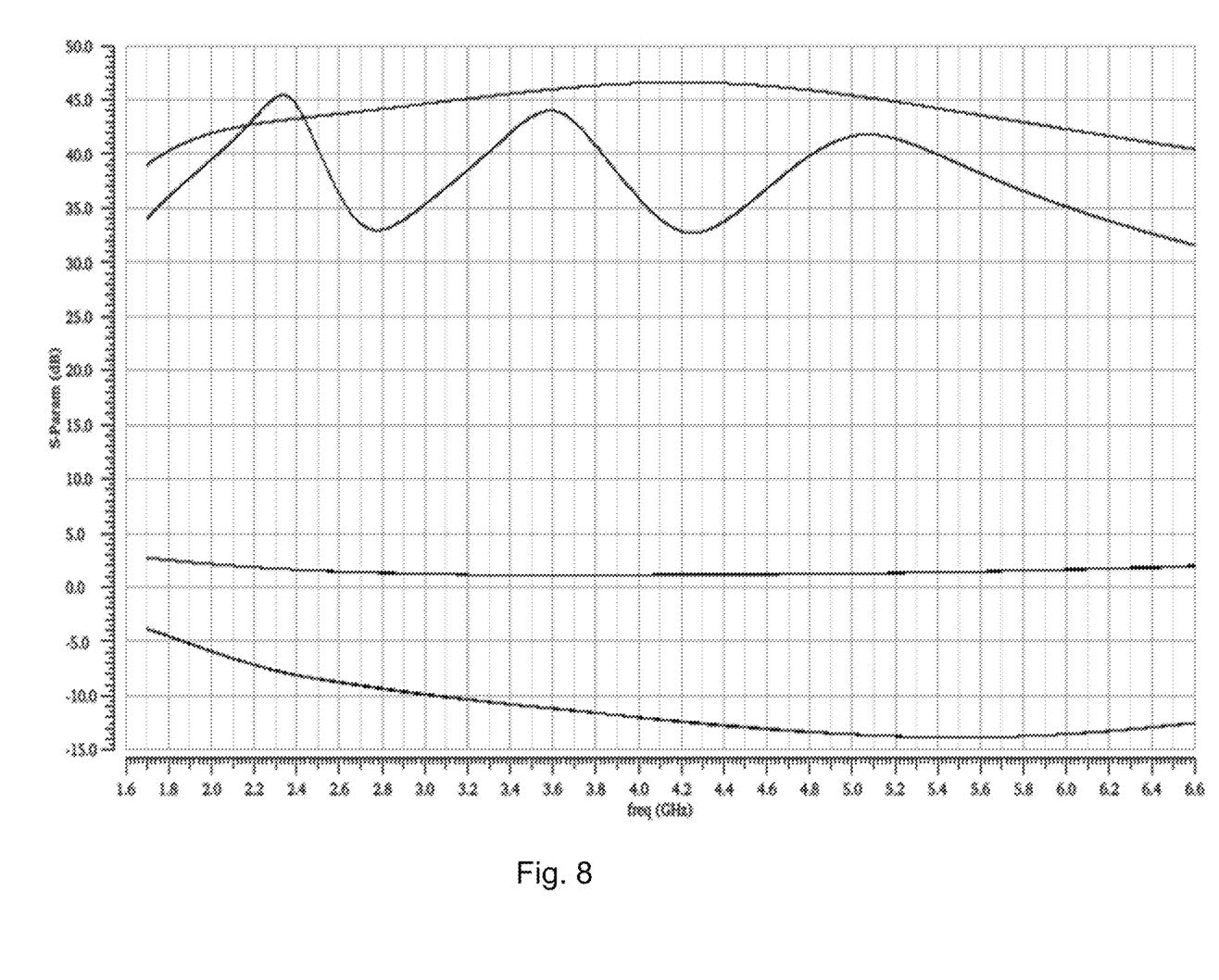
FIG. 8 shows simulation results of gain, noise figure and input match for a receiver front-end with a multi-band equalizer according to embodiments herein.

Simulations have been performed on a receiver front-end with the multi-band tapped-inductor equalizer 200 added to it after a VGA, as shown in FIG. 3. To compare the performance the multi-band equalizer 200 was disconnected and replaced with a 170Ω resistor, approximately the maximum impedance of the equalizer at resonances. Simulation results of the receiver gain (top two curves), noise figure (NF) (middle curve) and input match (S11) (bottom curve) are shown in FIG. 8. As can be seen in the figure, the equalizer has negligible effect on NF and input match while introducing three pass bands as desired.

Figure 9:
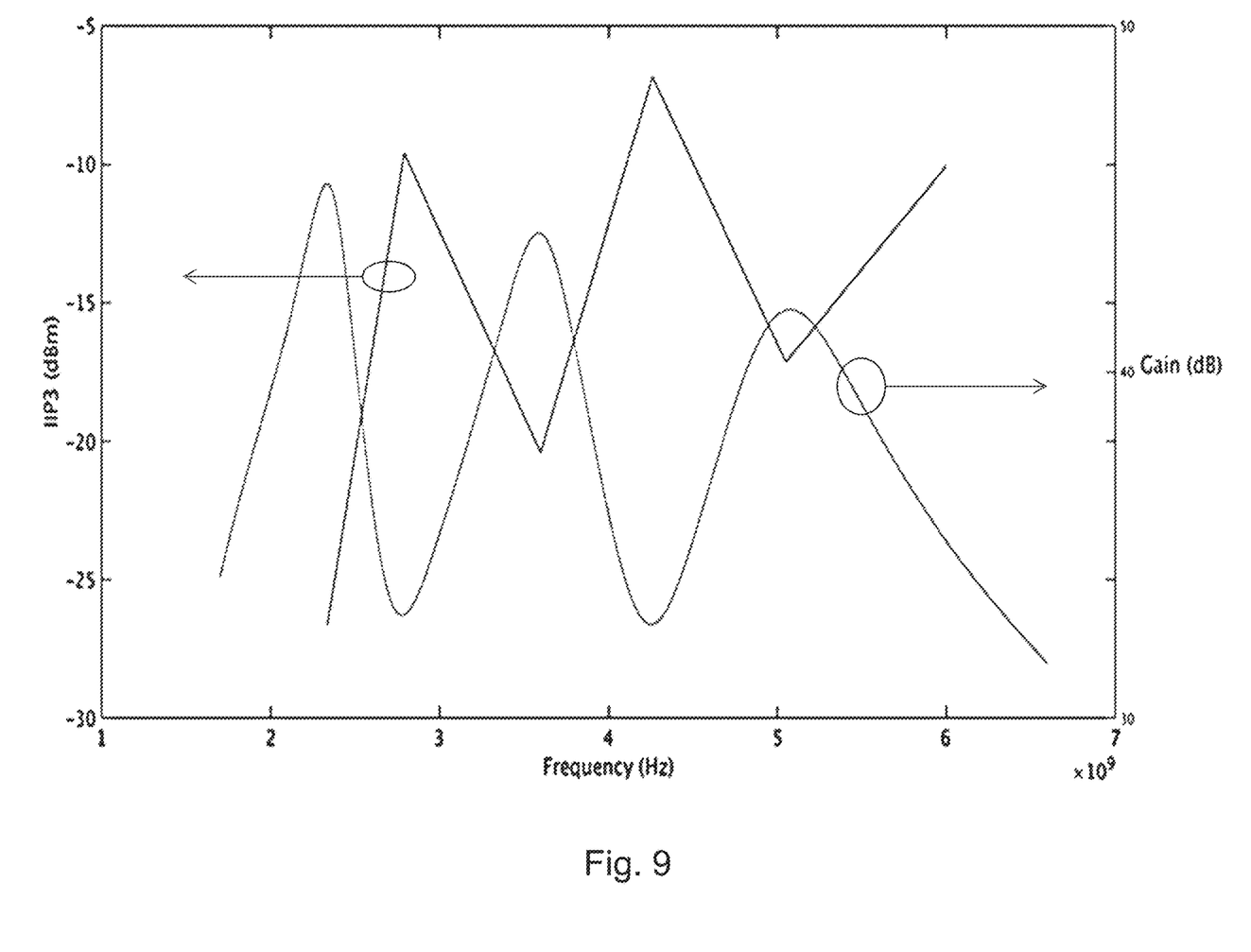
FIG. 9 shows simulation results of the third order interception point IIP3 and gain for a receiver front-end with a multi-band equalizer according to embodiments herein.

The multi-band equalizer 100, 200, 401, 402 is implemented by passive elements, including transistors operating as switches, and is therefore linear. To investigate the linearity of a receiver chain including the multi-band equalizer, two-tone simulations have been performed with a tone frequency spacing equal to 20 MHz. The frequency of the two tones are swept across the desired RF frequency, e.g. from 2 to 6 GHz. The simulation result is shown in FIG. 9. The figure shows both the third order interception point IIP3 and gain of the receiver front-end. As can be clearly seen, the IIP3 is improved by the equalizer stop band filtering, i.e. the notch depth at different frequencies, e.g. at around 2.8 GHz, 4.2 GHz.

Therefore, according to some embodiments herein, frequency notches of the multi-band equalizer 100, 200 may be controlled by tuning the capacitances of the programmable capacitors and/or selecting the tapped out terminals of the inductors in the multiple resonators.

Figure 10:
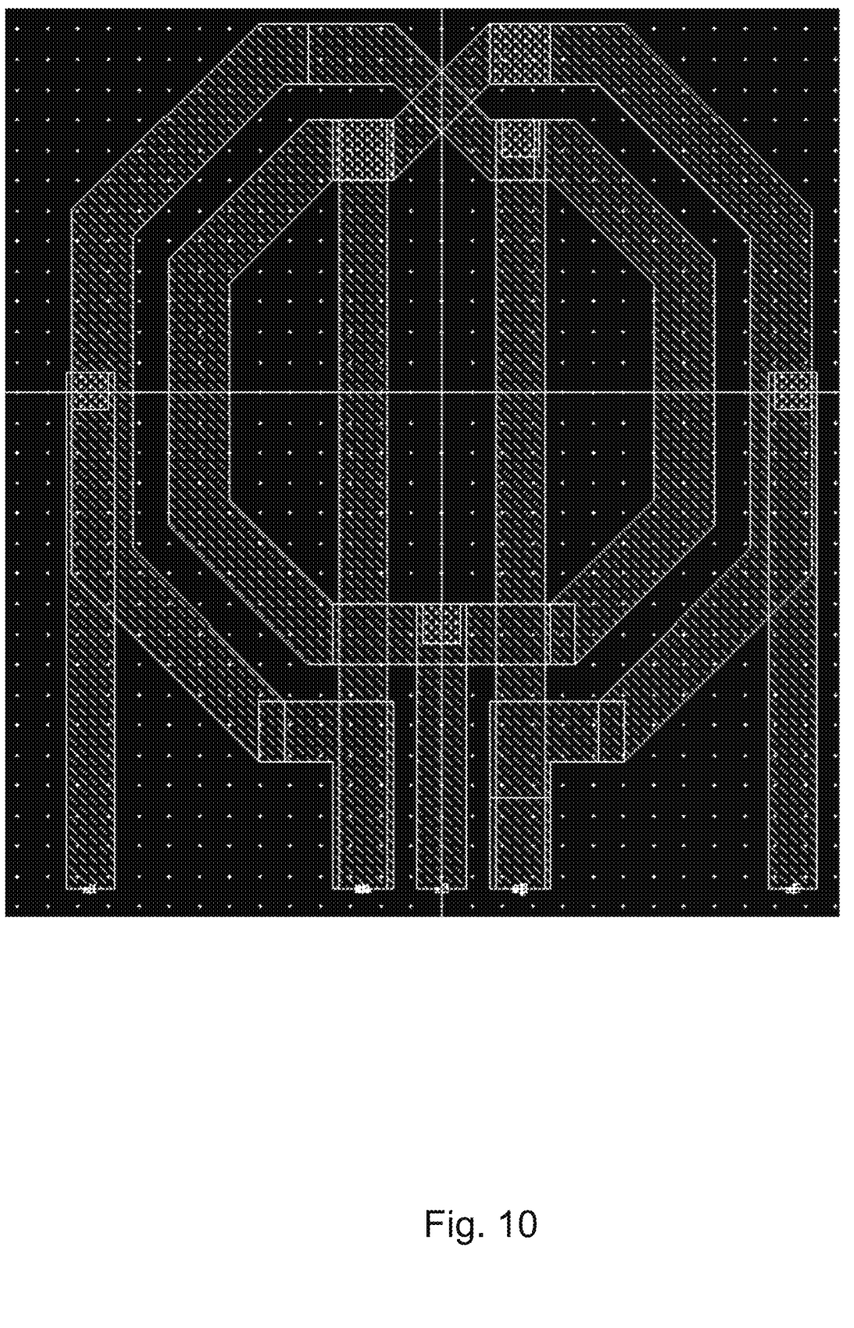
FIG. 10 shows an example inductor layout with taps according to embodiments herein.

The implementation of the capacitive tapping or capacitive-divider based equalizer is straight forward. It may be based on switched capacitors, where capacitors are switched in or out of the equalizer using metal-oxide-semiconductor (MOS) transistors. By programming the capacitance values in this way, both the effective capacitance, which sets the resonance frequency, and the capacitor ratio, which sets the gain, may be controlled. The tuning ranges of the capacitors are chosen to cover both the frequency and gain range simultaneously, and a suitable number of bits in the digital control is then chosen to provide the resolution needed. The tapped inductor implementation, on the other hand, needs to be more carefully designed for the required gain steps and range. This is because the number of gain steps is directly related to the inductor layout, where many gain steps requires an inductor with many taps. An example of a possible implementation of a taped inductor is shown in FIG. 10, where the inductor may be realized in the highest metal layer and traces in the second highest layer may be used for the taps. As can be seen there are 5 taps in this example.

To summarize, embodiments herein provide on-chip multi-band equalizers for use in wideband receivers, where both frequency and gain of the frequency bands of interest may be programmed. The multi-band equalizer may be connected to a signal node, for instance between two amplifier stages in the receiver. It then selects the bands of interest, and their gain may be programmed without changing the bandwidth, using a programmable tapping of the resonators. By series connecting tapped LC-resonators no buffers are needed between stages, and the fully passive structure of the multi-band equalizers provides high dynamic range and extremely low power consumption. Using inductive tapping the gain and frequency may be controlled independently. The multi-band equalizers according to embodiments herein reduce intermodulation distortion due to interference, and reduce the dynamic range needed in the ADC by equalizing the signal strengths of the signals of interest. Further, a single amplifier chain may be used, and there is no need for parallel paths with noise issue related signal combination.

Figure 11:
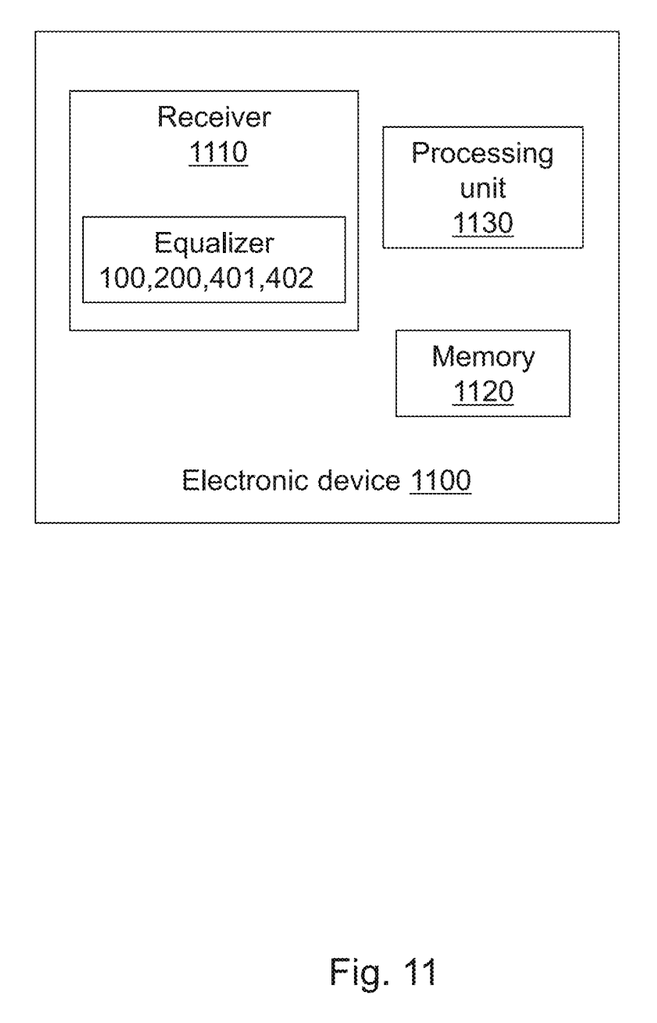
FIG. 11 is a block diagram illustrating a communication device in which a multi-band equalizer according to embodiments herein may be implemented.

The multi-band equalizers 100, 200, 401, 402 may be employed in various integrated circuits, electronic circuits or devices, communication devices or apparatus. FIG. 11 shows a block diagram for an electronic device 1100. The electronic device 1100 comprises a transceiver 1110 which comprises a multi-band equalizer 100, 200, 401, 402. The electronic device 1100 may comprise other units, where a memory 1120, a processing unit 1130 are shown. The electronic device 1100 may be a user equipment or a mobile device, a wireless communication device, or a radio base station for a cellular communication system.

Those skilled in the art will understand that the multi-band equalizers 100, 200, 401, 402 according to embodiments herein may be implemented by any semiconductor technology, e.g. Bi-polar, N-type Metal Oxide Semiconductor (NMOS), P-type Metal Oxide Semiconductor (PMOS), Complementary Metal Oxide Semiconductor (CMOS), Fully Depleted Silicon on Insulator (FDSOI) or Micro-Electro-Mechanical Systems (MEMS) technology etc.

The word "comprise" or "comprising", when used herein, shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

What is claimed is:

1. An integrated circuit, comprising:
   a first amplifier; and
   a multi-band equalizer, the multi-band equalizer comprising:
   multiple resonators, each resonator having a first, second and third terminal, wherein each resonator comprises:
   an inductor connected between the first and second terminals; and
   two programmable capacitors connected in series between the first terminal and second terminal, the interconnection of the two programmable capacitors being tapped out and connected to the third terminal; and wherein
   the multiple resonators are series connected such that the third terminal of a preceding resonator is connected to the first terminal of a succeeding resonator and the first terminal of the first resonator is connected to an output of the first amplifier and the third terminal of the last resonator is connected to a signal ground, or the first terminal of the first resonator is connected to a signal ground and the third terminal of the last resonator is connected to the output of the first amplifier.

2. The integrated circuit of claim 1, comprising two of the multi-band equalizers of claim 1, wherein pairs of inductors in two corresponding resonators are implemented by transformers.

3. The integrated circuit of claim 1, comprising two of the multi-band equalizers of claim 1.

4. The integrated circuit of claim 1, wherein both gain and resonance frequency of the multiple resonators are tunable by tuning the capacitances of the programmable capacitors in the multiple resonators.

5. The integrated circuit of claim 1, wherein frequency notches of the multi-band equalizer are controlled by tuning the capacitances of the programmable capacitors and/or selecting the tapped out terminal of the inductor in the multiple resonators.

6. The integrated circuit of claim 1, further comprising at least a second amplifier connected in series with the first amplifier, wherein the multi-band equalizer is connected to a node between the first and second amplifiers.

7. The integrated circuit of claim 6, wherein the integrated circuit comprises a receiver front-end circuit, the receiver front-end circuit comprising the first and second amplifiers and the multi-band equalizer.

8. An electronic device comprising the integrated circuit of claim 7.

9. An electronic device comprising the integrated circuit of claim 1.

10. The electronic device of claim 9, wherein the electronic device is any one of a receiver, a transmitter, a transceiver, a base station, a user equipment or a wireless communication device for a cellular communication system.

11. An integrated circuit, comprising:
    an amplifier; and
    a multi-band equalizer, the multi-band equalizer comprising:
    multiple resonators, each resonator having first, second and third terminals, wherein each resonator comprises:
    an inductor connected between the first and second terminals, wherein the inductor has two or more tapped out terminals with different inductances, the two or more tapped out terminals being selectively connected to the third terminal;
    a programmable capacitor connected between the first and second terminals; and wherein
    the multiple resonators are series connected such that the third terminal of a preceding resonator is connected to the first terminal of a succeeding resonator and, when used in the receiver, the first terminal of the first resonator is connected to a signal node of the receiver and the third terminal of the last resonator is connected to a signal ground, or the first terminal of the first resonator is connected to a signal ground and the third terminal of the last resonator is connected to a signal node of the receiver.

12. The integrated circuit of claim 11, comprising two of the multi-band equalizers of claim 11.

13. The integrated circuit of claim 11, comprising two of the multi-band equalizers of claim 11, wherein pairs of inductors in two corresponding resonators are implemented by transformers.

14. The integrated circuit of claim 11, wherein, for each resonator, the gain and resonance frequency of that resonator are tunable by tuning the capacitance of the programmable capacitor and/or selecting the tapped out terminals of the inductors in that resonator.

15. The integrated circuit of claim 11, wherein frequency notches of the multi-band equalizer are controlled by tuning the capacitances of the programmable capacitors and/or selecting the tapped out terminal of the inductor in the multiple resonators.

16. The integrated circuit of claim 11, further comprising at least a second amplifier connected in series with the first amplifier, wherein the multi-band equalizer is connected to a node between the first and second amplifiers.

17. The integrated circuit of claim 16, wherein the integrated circuit comprises a receiver front-end circuit, the receiver front-end circuit comprising the first and second amplifiers and the multi-band equalizer.

18. An electronic device comprising the integrated circuit of claim 17.

19. An electronic device comprising the integrated circuit of claim 11.

20. The electronic device of claim 19, wherein the electronic device is any one of a receiver, a transmitter, a transceiver, a base station, a user equipment or a wireless communication device for a cellular communication system.

* * * * *